United States Patent [19]

Makino et al.

[11] 4,021,232

[45] May 3, 1977

[54] CAST IRON MELTING PROCESS

[75] Inventors: Michio Makino; Takashi Kawai, both of Kitakyushu; Ryoji Takahashi, Yukuhashi; Yoshimi Kubo; Fumio Obata, both of Kitakyushu, all of Japan

[73] Assignee: Hitachi Metals, Ltd., Japan

[22] Filed: July 29, 1975

[21] Appl. No.: 600,117

[30] Foreign Application Priority Data

Aug. 9, 1974 Japan ............................... 49-90997
Apr. 30, 1975 Japan ............................... 50-51396
Apr. 30, 1974 Japan ............................... 49-51397

[52] U.S. Cl. ........................................ 75/12; 75/57
[51] Int. Cl.² ................................................ C21C 5/52
[58] Field of Search ................................. 75/12, 57

[56] References Cited

UNITED STATES PATENTS 3,524,742   8/1970   Williams ............................... 75/57

Primary Examiner—P. D. Rosenberg
Attorney, Agent, or Firm—Craig & Antonelli

[57] ABSTRACT

A cast iron melting process comprising the steps of charging recarburizer in the lower portion of an electric arc furnace, charging iron scraps, and charging oxidizing slag-forming agents and/or sponge irons, and/or blowing oxygen therein to make oxidizing slag, whereby a recarburizing reaction of an iron melt with the recarburizer is carried out in parallel with an oxidizing reaction of an iron melt with an oxidizing slag, thereby minimizing the loss of C and Si, while improving a recarburizing yield, with the resulting improvements in economy.

37 Claims, 12 Drawing Figures

CAST IRON MELTING PROCESS

This invention relates to a cast iron melting process, and more particularly to a cast iron metling process which is well adapted to obtain an original or primary melt for spheroidal graphite cast iron; a majority of whose matrix consists of a ferritic structure in as cast state.

Figure 1:
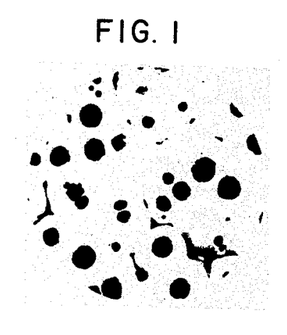
FIG. 1 is microscopic structures of spheroidal graphite cast iron having a ferrite matrix in as cast state.

The spheroidal graphite cast iron may be classified into that having a ferrite matrix and that having a pearlite matrix. Among those, the spheroidal graphite cast iron having a ferrite matrix has good ductility and machinability, so that it finds a wide use as a raw material for parts of motor vehicles and other mechanical parts. Hitherto, the spheroidal graphite cast iron has been produced by applying a heat treatment to the spheroidal graphite cast iron having mainly a pearlite matrix. However, according to the improvements in the matrix structures of the spheroidal graphite cast iron in as cast state, there has been established a process for producing a spheroidal graphite cast iron having a ferrite matrix which affords good ductility and machinability without carrying out heat treatment, the aforesaid cast iron having a structure, a majority of which consists of a ferrite matrix in as cast state. Table 1 shows the mechanical properties of a spheroidal graphite cast iron having a ferrite matrix in as cast state, and FIG. 1 shows microscopic structures of cast iron thus produced.

Table 1

| Sample No. | Tensile strength (kg/mm$^2$) | Elongation (%) | Hardness (HB) |
|---|---|---|---|
| 1 | 46.2 | 21.8 | 163 |
| 2 | 44.8 | 26.2 | 156 |
| 3 | 45.2 | 25.4 | 159 |
| 4 | 44.2 | 28.2 | 159 |
| 5 | 47.2 | 20.4 | 167 |

The spheroidal graphite cast iron having a ferrite matrix in as cast state may dispense with heat treatment, thus presenting advantages in improving its production efficiency as well as saving energy. However, for achieving the consistent or stable production of spheroidal graphite cast iron having a ferrite matrix in as cast state, it is imperative to minimize the contents of those elements that make pearlite stabilize and graphitization retard in the primary melt. Cr and Mn are typical of those elements, and particularly the content of manganese should be no more than 0.25% by weight (This will be referred to by simply using %, hereinafter.) Manganese is contained in commercially available steel scaps in amounts of 0.4 to 0.7%, in general, so that the desired production of spheroidal graphite cast iron having a ferrite matrix in as cast state should be achieved by adding a great amount of special pig iron containing least of elements, such as Mn, which hinders the graphitizing.

More particularly, there is obtained a primary melt of spheroidal graphite cast iron having a ferrite matrix in as cast state by mixing a great amount of special pig iron containing least of Mn, for instance, SOREL METAL (commercial name), with steel scraps and return or secondary scraps. However, there is confronted another difficulty in supplying a sufficient amount of special pig iron, and such pig iron is costly, so that there arises a limitation stemmed from economy, thus hindering the extensive use of the spheroidal graphite cast iron having a ferrite matrix in as cast state.

On the other hand, in case iron scraps essentially consisting of steel scraps are used, without using the aforesaid pig iron, it is required to have the recarburizing operation or manganese removing operation for obtaining a primary melt of spheroidal graphite cast iron having a ferrite matrix in as cast state, since the steel scraps are low in carbon content and high in maganese content. (In passing, it is most economical and efficient to carry out the aforesaid recarburizing operation in the course of the melting step.)

In the general steel making process, an oxidizing agent (for instance iron ore, mill scale, etc.) is charged, coupled with a slag forming agent, in an attempt to reduce the contents of C and Si by using the oxidizing power of the slag formed by aforementioned agents on the surface of an iron melt, or oxygen is blown into an iron melt. In this respect, Mn content is necessarily reduced. Accordingly, this may be possibly applied to the process for producing a primary melt of a low manganese content for the production of the spheroidal graphite cast iron having a ferrite matrix in as cast state.

However, there arises still another shortcoming in that, if the recarburizing operation is carried out in the course of melting of steel scraps as has been described, and the aforesaid oxidizing treatment is applied to a cast iron melt which has completed the recarburizing, the bath temperature is increased due to the combustion heat of Si and Mn in the case of oxygen blowing process, and hence there results an oxidizing loss of carbon.

Table 2 shows the loss in the amounts of respective elements, due to oxidation, in which the aforesaid loss depends on the contents of the respective elements and temperatures. In short, silicon is selectively oxidized in the case of a high-Si melt, while carbon is selectively oxidized at an elevated temperature, thus failing to achieve the object to remove manganese.

Table 2

| Temperature (°C) | Composition of iron melt at the time of melting down | | | Composition of iron melt after blowing of oxygen | | | Oxidation loss (%) | | |
|---|---|---|---|---|---|---|---|---|---|
| | C | Si | Mn | C | Si | Mn | C | Si | Mn |
| 1350 | 3.58 | 1.14 | 0.51 | 3.54 | 0.09 | 0.13 | 1.1 | 92.1 | 74.5 |
| 1350 | 3.45 | 1.27 | 0.50 | 3.20 | 0.07 | 0.07 | 7.2 | 94.5 | 86.0 |
| 1350 | 3.54 | 0.56 | 0.51 | 3.40 | 0.10 | 0.19 | 4.0 | 82.1 | 78.4 |
| 1350 | 3.52 | 0.48 | 0.49 | 3.50 | 0.08 | 0.08 | 0.6 | 82.3 | 83.7 |
| 1450 | 3.51 | 1.17 | 0.52 | 2.90 | 0.60 | 0.30 | 17.4 | 48.7 | 42.3 |
| 1450 | 3.46 | 1.29 | 0.53 | 2.75 | 0.48 | 0.20 | 20.5 | 62.8 | 62.3 |
| 1450 | 3.48 | 0.30 | 0.25 | 2.46 | 0.07 | 0.05 | 29.3 | 76.7 | 80.0 |
| 1450 | 3.53 | 0.40 | 0.18 | 2.61 | 0.09 | 0.06 | 26.1 | 77.5 | 66.7 |

On the other hand, in case a manganese removing reaction takes place, with a bath temperature maintained low by charging a slag forming agent and the like, it takes a considerably long time for the progress of the above reaction.

In other words, even if the recarburizing operation is applied in either case in the course of melting from economical viewpoints, there arises an accompanying, further greater economical loss in achieving the manganese removing operation. In constrast thereto, if the manganese removing treatment due to the aforesaid use of slag is applied to a steel bath which has not been subjected to recarburizing treatment, there may be obtained a desired steel bath of a low manganese content, without the loss of carbon which is advantageous or effective element.

In this case, however, there may not be achieved a desired cast iron composition, unless the recarburizing treatment is effected by injecting graphite powder into a steel bath in a furnace, or by transferring iron melt into a ladle, after which the recarburizing tretment is applied. In this case the temperature of the steel bath should be risen extremely high, and as a result it will accompany heat loss. This further causes a lowered recarburizing yield, so that it is difficult to add a great amount of carbon. In addition, in case the melt is transferred into a ladle for recarburizing treatment, there results a further greater heat loss and lowering in ccomony and productivity, requiring a great amount of man hours.

SUMMARY OF THE INVENTION

It is accordingly an object of the present invention to provide a cast iron melting process which avoids the aforesaid shortcomings by efficiently and economically obtaining a primary melt for spheroidal graphite cast iron having a ferrite matrix in as cast state, without the use of special low-manganese-content pig iron.

According to the present invention, there is provided a cast iron melting process comprising the steps of: charging recarburizer in the lower portion of an arc furnace; charging and/or blowing a material adapted to form a slag, coupled with iron scraps, for carrying out the melting operation, whereby a recarburizing reaction of said recarburizer with an iron melt is carried out in parallel with an oxidizing reaction of the aforesaid iron melt with oxidative slag in the low temperature range i.e., during the melting of the iron scraps and/or immediately after the melting of the iron scraps.

DESCRIPTION OF THE PREFERRED EMBODIMENTS

Figure 2:
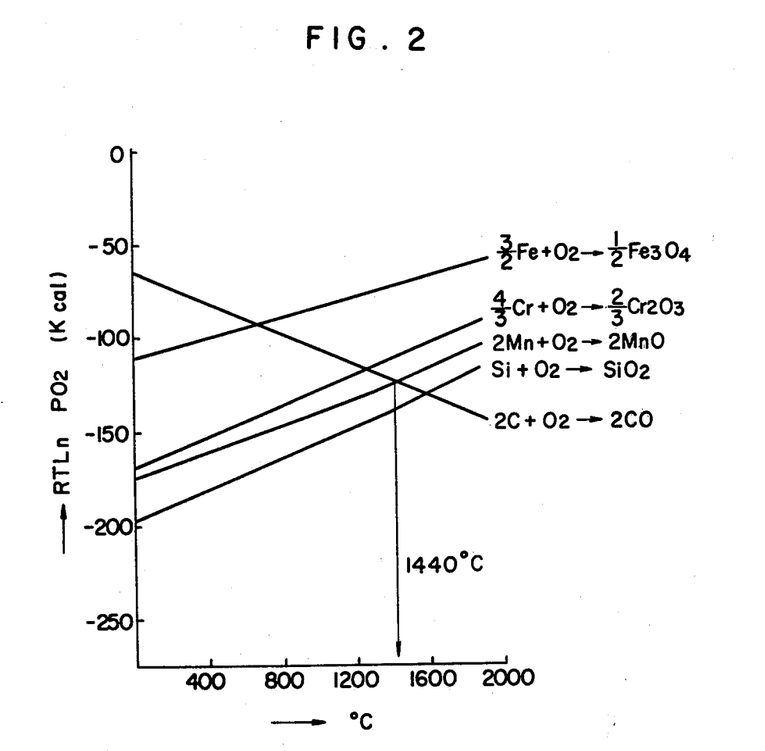
FIG. 2 is a plot showing the variation in oxygen affinity, of the principal elements contained in iron.

The oxidizing reaction of various elements contained in an iron melt due to oxidative slag or oxygen gas takes place in such a manner that certain elements are selectively oxidized depending on a reaction-temperature rise or decrease, because of the different interrelationship between the oxygen affinities and the reaction temperatures for the various elements. FIG. 2 shows the variation in the oxygen affinity at varying temperatures, of the principal elements.

As can be seen from FIG. 2, the affinities of Si, Mn and Cr are greater than that of C in the low temperature range, so that those elements are selectively oxidized. In contrast thereto, if the temperature is raised to a high temperature (a high temperature range of above 1440° C), then carbon is selectively oxidized. The present invention is thus based on the aforesaid metallurigcal reaction. (The first aspect of the invention.)

Figure 3:
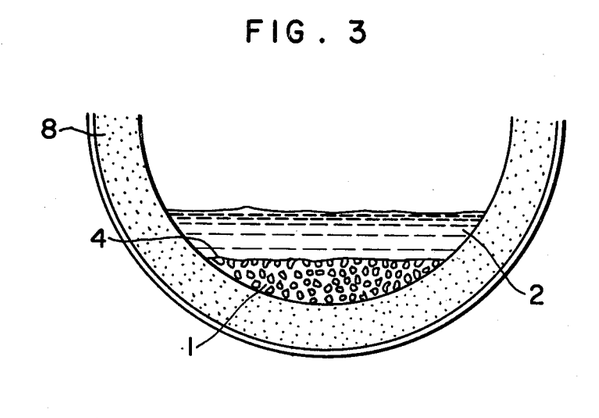
FIG. 3 is a longitudinal cross-sectional view illustrating a recarburizing mechanism in an arc furnace.

The recarburizing phenomenon in an arc furnace has been clarified according to the present invention. More specifically, as shown in FIG. 3, when a recarburizer 1 of a given amount and a granular form is placed in the bottom portion of an arc furnace 8, and iron scraps are charged into the upper portion of the furnace for melting, then iron scraps which have been melted due to an arc flow downwards in the form of melt droplets, so that the iron melt 2 covers the surface of recarburizer 1 to define an interface 4. In this respect, if the size of the recarburizer 1 is selected to a suitable value, then the iron melt 2 will not make ingress into voids among the grains of recarburizer 1 due to the surface tension prevailing thereon. Accordingly, the recarburizer 1 does not float to the surface of a melt, until the completion of the melting operation, despite the low specific gravity thereof, thus remaining in the bottom of the furnace, so that the recarburizing reaction proceeds through its contacting surface with the iron melt 2, and the recarburizer is consumed accordingly. The present invention is secondarily based on the aforesaid recarburizing mechanism. (The second aspect of the invention.)

For carrying out the aforesaid oxidizing action and recarburizing action in parallel with each other in the same furnace, it is imperative that a melt of iron scraps, during the melting operation or in a low temperature range immediately after the melting thereof, should firstly be subjected to oxidation in a sufficient degree and that the recarburizing action and the oxidizing reaction be carried out in a physically separated manner. The first point may be achieved by utilizing the first aspect of the present invention, which refers to the metallurgical reaction, while the second point may be achieved by utilizing the aforesaid second aspect of the present invention which refers to the recarburizing mechanism.

Figure 4:
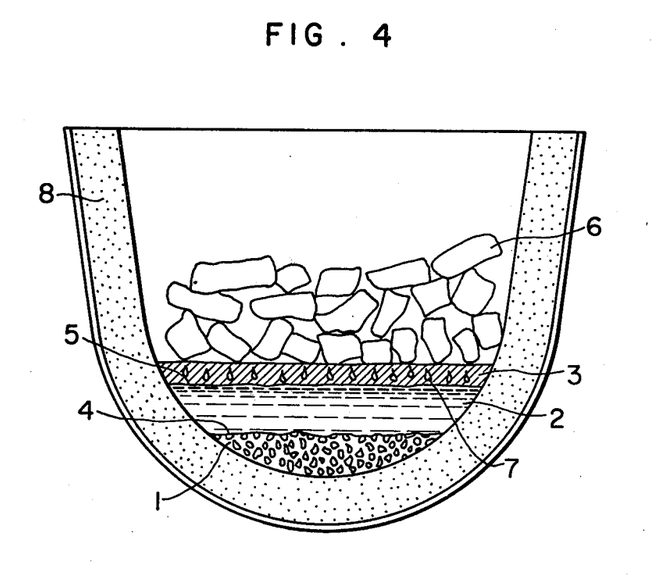
FIGS. 4 and 5 are explanatory views of recarburizing and oxidizing reactions within the arc furnace.

Now, description will be given of the sequence of operation by way of example, hereunder. As defined in claim 2 which will be given hereinafter, powdered recarburizer such as pitch cokes of a size of no more than 10 mm is placed in the bottom portion of an arc furnace in a manner that the top surface of the recarburizer will be flat substantially in the horizontal direction, and then a strong oxidative slag-forming agent is scattered thereon, followed by superposition of given iron scraps thereon. Thus, when the melting operation proceeds, then the iron scraps which have been melted due to the heat at a high temperature, of an arc, will flowdown in the form of a droplets, thereby melting the slag-forming agent having a low melting point, while melt droplets themselves undergo a strong oxidizing action, so that the elements having a strong oxygen affinity are removed according to the oxidizing reaction, while the oxidized products thereof are fused together with the slag-forming agent to thereby form slags. The melt droplets further flow down and reach the surface of the recarburizer in the bottom portion of the furnace. With the progress of such operations, there appears a condition in the furnace, wherein as shown in FIG. 4 the two phases of iron melt 2 and slags 3 cover the surface of the recarburizer 1.

While pich cokes of a size of no more than 6 mm are used as recarburizer in one example of the aforesaid operation, it is preferable to use cokes of a size of no more than 6 mm, considering a recarburizing yield and the like. In addition, for improving the recarburizing reaction and the recarburizing yield, it is preferable to use the size of no less than 2.5 mm. In either case, however, it is not to mention that granules of a size of no more than the aforesaid size may be present therein.

Description will be given of the condition of recarburizing and oxidizing reaction by referring to FIG. 4. The recarburizer 1 contacts only the iron melt 2, being separated from slags 2 by the medium of iron melt 2. As a result, the carburizer 1 is gradually melted into the iron melt 2 through the interface 4 between the recarburizer 1 and the iron melt 2, so that the carbon content in the iron melt 2 is increased accordingly. On the other hand, the iron melt 2 contacts with the slags 3 on its top surface, so that the removal of elements such as Si, Mn, Cr and the like according to the oxidizing reaction proceeds along the interface 5. At this time, the temperature of the iron melt 2 is maintained as low as 1440° C, since the iron melt is present in the course of melting of iron scraps 6 or immediately after the melting thereof, thus failing to oxidize carbon, which is an effective element and which has been introduced through the interface 4 into the iron melt, as has been described in conjunction with the first aspect of the present invention. Shown at 7 is melt droplets, and at 8 an arc furnace. In this manner, the oxidizing reaction and recarburizing reaction take place in a manner separated by the medium of the iron melt 2, while the aforesaid reactions proceed along the upper and lower interfaces 4, 5 at the same time, so that there may be obtained a primary melt adapted for the spheroidal graphite cast iron of a high C, low Mn, and low Cr content, which iron has a ferrite matrix in as cast state.

The description given thus far refers to an example wherein a strong slag-forming agent is used as an example for producing a oxidative slag. Now, description will be turned to an example wherein, as defined in claim 3, an oxidizing reaction using oxygen blowing without the use of slag forming agent and a recarburizing reaction are carried out in parallel with each other.

Firstly, in the same manner as in the previous example, recarburizer is placed on the bottom of a furnace, and then iron scraps are charged in a given amount, followed by melting. Then, the iron scraps which have been melted due to the heat at a high temperature, of an arc flow down in the form of droplets to cover the surface of recarburizer. When oxygen is blown, with the surface of the recarburizer covered with the iron melt, i.e., with the blown oxygen kept from direct contact with the recarburizer, then the recarburizing reaction will proceed along the interface between the recarburizer and the iron melt, while the oxidizing reaction will take place at the same time, due to oxygen being blown. In other words, the recarburizer is melted into the iron melt gradually, so that carbon content in the iron melt is increased accordingly. On the other hand, elements such as Si, Mn, Cr and the like in the iron melt are rapidly removed according to the oxidation due to oxygen being blown. The temperature of the iron melt is maintained low less than 1440° C, since iron scraps are in the course of melting, so that carbon is not oxidized, which is an effective element and which has been melted through the interface into the iron melt, as has been described in the first aspect of the present invention. In this manner, the oxidizing reaction and the recarburizing reaction take place at the same time, so that a primary melt of spheroidal graphite cast iron of a high C, low Mn and low Cr content, which has a ferrite matrix in as cast state.

In case oxygen blowing is effected without the use of a slag-forming agent, then the oxidizing reaction takes place rapidly, removing Si, Mn, Cr and the like according to the oxidizing reaction.

Figure 5:
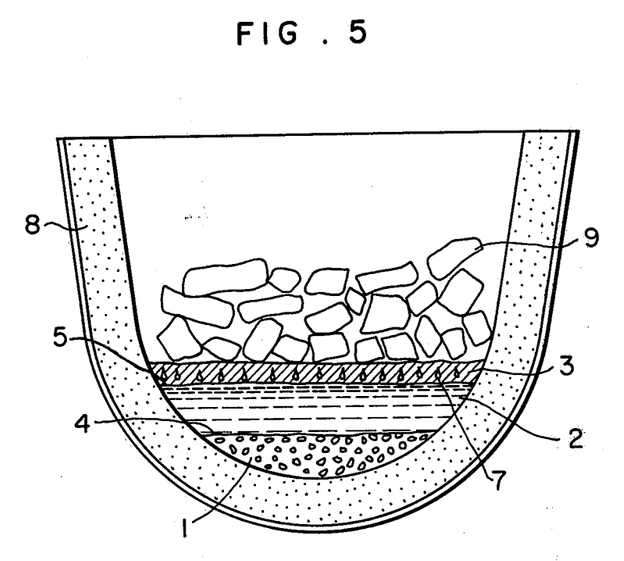

Description will be given of one example of the operation as defined in claim 4. Firstly, powdered recarburizer such as pitch cokes of a size of no more than 10 mm is charged in the bottom portion of an arc furnace in a manner that its surface becomes flat substantially in the horizontal direction, and then sponge iron is mixed with the total charge of scraps in amount of 2 to 10% by weight in terms of unreduced iron equivalent amount, after which iron scraps of a given amount are charged thereon. When the melting is carried out in this manner, the iron scraps which have been melted due to the heat at a high temperature, of an arc flow down in the form of droplets to melt unreduced part in the sponge iron, while the droplets are subjected to a strong oxidizing action, so that elements having strong oxygen affinity, such as Si, Mn, Cr and the like, are removed according to the oxidizing reaction, the oxidized products forming molten slag. The droplets further flow down and reach the surface of the recarburizer in the bottom portion of the furnace. According to the aforesaid process, the two liquid phases of iron melt 2 and slag 3 cover the recarburizer 1 as shown in FIG. 5.

Meanwhile, in the example showing the sequence of the aforesaid operation, pitch cokes of a size of no more than 10 mm are used. However, it is preferable to use the pitch cokes of a size of no more than 6 mm, considering a recarburizing yield. On the other hand, for improving the recarburizing reaction and recarburizing yield, the size should preferably be no more than 2.5 mm. In either case, it is needless to mention that the pitch cokes of a size of below the aforesaid range may be contained therein.

Now, description will be given of the recarburizing and oxidizing reactions by referring to FIG. 5. The recarburizer 1 is in contact with only the iron melt 2, while the recarburizer 1 is separated by the medium of the iron melt 2. Accordingly, the recarburizer 1 is gradually dissolved into the iron melt through the interface 4 between the recarburizer 1 and the iron melt 2, and carbon content in the iron melt 2 is gradually increased accordingly. On the other hand, the iron melt 2 is in contact with the slag 3 on its top surface, so that the rapid removal of elements such as Si, Mn, Cr according to the oxidizing reaction proceeds along the interface 5. At this time, the temperature of the iron melt 2 is maintained as low as below 1440° C, since the sponge iron and iron scraps 19 are in the course of melting or immediately after the melting, so that, as has been described with reference to the first aspect of the present invention, the effective element, carbon, will not be oxidized, which has been dissolved through the interface 4 into the iron melt 2. In passing, shown at 7 are melt droplets, and at 8 an arc furnace. In this manner, both the oxidizing reaction and the recarburizing reaction proceed in parallel along the interfaces 4, 5, without interference therebetween due to the intervening iron melt 2, so that a primary melt for spheroidal graphite cast iron having a ferrite matrix in as cast state may be achieved, the aforesaid cast iron having a high carbon content, low Mn content and low Cr content. The utilization of the unreduced components in the sponge iron as an oxidative slag-forming agent not only enhances the oxidizing reaction but also permits to utilize the reducing iron having low content impurities as an iron source, so that there may be achieved spheroidal graphite cast iron having a ferrite matrix in as cast state, which is better than those obtained in the so called iron ore process and oxygen process. In addition, when comparing this with the case of the iron ore process, the sponge iron is a ferromagnetic material, so that a lifting magnet may be used for charging and hence the melting operation may be simplified.

The aforesaid example refers to the case of resorting to the strong oxidative slag which has been obtained from the unreduced iron contained in the sponge iron. Now, description will be turned to an example wherein, as defined in claim 5, the amount of the sponge iron is reduced and part of the strong oxidative slag is supplemented due to the oxygen blowing, so that the oxidizing reaction according to the strong oxidative slag and the recarburizing reaction according to the recarburizer are carried out in parallel with each other.

Firstly, as in the previous example, the recarburizer is placed on the bottom of a furnace and then an iron scraps of a given amount and sponge iron of no more than 2% in terms of the equivalent amount of unreduced iron, to the total amount of iron scraps charged are charged. When the melting is commenced, iron scraps which have been melted due to the heat at a high temperature, of an arc flow down in the form of droplets to cover the surface of the recarburizer. When oxygen is blow into the furnace in a condition where the iron melt covers the surface of the recarburizer, i.e., where oxygen being blown is kept from the direct contact with the recarburizer, the strong oxidative slag produced from the unreduced iron contained in the sponge iron as well as that produced according to the blowing of oxygen gas cover the surface of the iron melt, while the oxidizing reaction proceeds in parallel with the recarburizing reaction along the interface between the recarburizer and the iron melt. In other words, the recarburizer is gradually dissolved into the iron melt, and carbon content is gradually increased accordingly. On the other hand, the removal of elements such as Si, Mn and Cr according to oxidation from the iron melt, proceeds rapidly. At this time, the temperature of the iron melt is maintained at no more than 1440° C, since the iron melt is yet in the course of melting of iron scraps, so that carbon as an effective element will not be oxidized, which has been dissolved into the iron melt through the medium of an interface, as has been described with reference to the first aspect of the present invention. In this manner, the oxidizing reaction and recarburizing reaction proceed in parallel with each other, so that a primary melt for spheroidal graphite cast iron having a ferrite matrix in as cast state may be achieved, the aforesaid cast iron having a high carbon low Mn and low Cr content.

The utilization of the sponge iron and oxygen gas as strong oxidative slag-forming agent considerably enhances the oxidizing reaction, and hence remove Si, Mn, Cr and the like for a short period of time, as compared with the cases of the iron ore process and reducing iron process.

Description will now be given of one example of the sequence of operation which is covered under claim 6 to be described hereinafter. The recarburizer is placed in the bottom portion of an arc furnace, and then iron scraps of a given amount are charged therein. Thus, when the melting is commenced, then iron scraps which have been melted due to the heat at a high temperature, of an arc flow down in the form of droplets to cover the surface of the recarburizer. When powdered iron ore (grain size of 0.5 to 15 mm) and oxygen as a carrier gas are blown into the furnace, in the condition where an iron melt covers the surface of the recarburizer, i.e., where the oxygen being blown is kept from the direct contact with recarburizer, then the recarburizing reaction proceeds along the interface between the recarburizer and the iron melt and the oxidizing reaction according to the blowing of iron ore and oxygen proceed in parallel with each other. In other words, the recarburizer is gradually dissolved into the iron melt, and carbon content in iron melt is gradually increased, accordingly. The iron ore thus being blown oxidizes the iron melt along an interface between the iron melt and the iron ore and removes Si, Mn, Cr and the like according to the oxidizing reaction, while oxygen used as a carrier gas reacts with iron in a solid state (unmelted) and iron melt, so that Si, Mn, Cr and the like are removed according to the oxidizing reaction. The temperature of the iron melt is maintained no more than 1440° C, since the iron melt is in the course of melting of iron scraps, so that carbon as an effective component will not be oxidized. In addition, the oxidizing reaction in this respect proceeds much rapidly, as compared with the cases of using only iron ore and only oxygen. The grain size of the iron ore in this case should preferably be in the range of from 0.5 to 5 mm. However, the grain size or no more than 15 mm achieves the intended purposes.

By blowing iron ore which is being carried by oxygen gas, the oxidizing reaction for Si, Mn, Cr and the like is further accelerated, as compared with the cases of the iron ore process and the reducing iron process, so that spheroidal graphite cast iron having a ferrite matrix in as cast state may be obtained for a short period of time.

The following examples are illustrative of the features of the present invention.

EXAMPLE 1

1.8% (270 kg) of powdered recarburizer was charged on the bottom of an arc furnace to be added to 15 tons of iron scraps, and then 2% (300 kg) of strong oxidative slag-forming agent, such as iron ore, was scattered on top of the above recarburizer and iron scraps, after which 75% (11,250 kg) of steel scraps and 25% (3,750 kg) of return scraps were charged thereto to a predetermined mixing ratio. The average composition of the scraps thus charged is shown in Table 3.

Table 3

| Ingre-dient | Composition (%) | | | | | Charging ratio % | Average composition (%) | | | | |
|---|---|---|---|---|---|---|---|---|---|---|---|
| | C | Si | Mn | P | Cr | | C | Si | Mn | P | Cr |
| Steel scrap | 0.20 | 0.20 | 0.50 | 0.020 | 0.05 | 75 | 0.15 | 0.15 | 0.38 | 0.015 | 0.04 |
| Return scrap | 3.60 | 2.60 | 0.13 | 0.012 | 0.02 | 25 | 0.90 | 0.65 | 0.05 | 0.003 | 0.01 |
| Total | | | | | | 100 | 1.05 | 0.80 | 0.43 | 0.018 | 0.05 |

When the charge thus prepared was melted electrically, the temperature of iron melt at the time of melting down was at 1360° C, and the recarburizing reaction and oxidizing reaction were carried out in parallel with each other, thus achieving an iron melt of low Mn content and low Cr content as follows:

C — 2.70%
Si — 0.16%
Mn — 0.15%
P — 0.011%
Cr — 0.02%

Then, the slag in the furnace was removed and the melt was heated to a temperature of 1500° C, after which the iron melt was transferred to a low frequency induction furnace, where carbon and silicon were added thereto, thereby obtaining a primary melt for spheroidal graphite cast iron.

Figure 6:
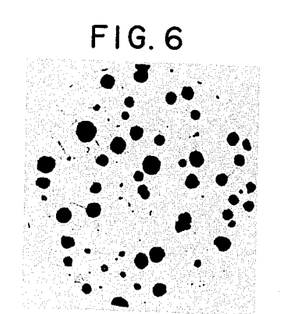
FIGS. 6 to 12 are photographs illustrating the microscopic structures of spheroidal graphite cast iron having a ferrite matrix in as cast state, which have been obtained in the examples according to the present invention.

The following is the chemical composition of the spheroidal graphite cast iron having a ferrite matrix in as cast state, which was obtained by subjecting the primary melt to sphroidizing treatment and inoculating treatment. The microscopic structures of the above cast iron are shown in FIG. 6.

C — 3.60%
Si — 2.58%
Mn — 0.15%
P — 0.011%
S — 0.004%
Cr — 0.02%
Mn — 0.48%

However, Si (0.8%) which was obtained from the ingredients of steel scraps and return scraps (Table 3) is an effective component of cast iron, so that the removal of Si according to the oxidizing reaction is an economical loss. For preventing the loss, there has been proposed an example, in which steel scrps containing less amount of Si therein was used, as follows:

EXAMPLE 2

3.8% (750 kg) of powdered recarburizer was charged on the bottom of an arc furnace to be added to 15 tons of charged iron scraps, and then 2.50% (375 kg) of strong oxidative slag-forming agent was scattered on top of the charges, after which 15,000 kg of steel scraps was charged thereon. The composition of the steel scraps as used in this example is as follows:

C — 0.20%
Si — 0.20%
Mn — 0.50%
P — 0.020%
Cr — 0.05%

When the charge thus prepared was melted electrically, the temperature of the iron melt was found to be 1350° C at the time of melting down, while the recarburizing reaction and oxidizing reaction were carried out in parallel with each other, thus obtaining an iron melt of the following composition:

C — 3.10%
Si — 0.10%
Mn — 0.16%
P — 0.015%
Cr — 0.02%

After the slags for this iron melt had been removed, the melt was heated to a temperature of 1550° C, so that the recarburizing reaction further proceeded, thus obtaining the following composition:

C — 3.55%
Si — 0.10%
Mn — 0.17%
P — 0.012%
Cr — 0.010%

Since silicon should be added to the above iron melt to be used as a primary melt for the sphroidal graphite cast iron having a ferrite matrix in as cast state, then silicon was added thereto to thereby obtain an iron melt adapted as a primary melt for the spheroidal graphite cast iron having a ferrite matrix in as cast state, and having a composition as follows:

C — 3.60%
Si — 1.50%
Mn — 0.17%
P — 0.012%
Cr — 0.01%

Figure 7:
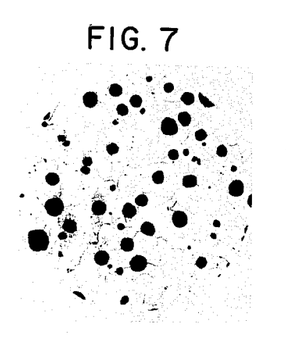

The following is the chemical composition of the spheroidal graphite cast iron having a ferrite matrix in as cast state, which had been obtained by subjecting the above primary melt to the sphroidizing treatment and inoculating treatment. In passing, FIG. 7 shows the microscopic structures thereof.

C — 3.50%
Si — 2.54%
Mn — 0.17%
P — 0.012%
S — 0.006%
Cr — 0.01%
Mg — 0.045%

Now, an example is shown below, in which an oxidizing reaction was carried out by blowing oxygent, without using strong oxidative slag-forming agent.

EXAMPLE 3

3.87% (570 kg) of powdered recarburizer was charged on the bottom of an arc furnace to be added to 15 tons of iron scraps, and then 15,000 kg of steel scraps were charged on top of the charge. The composition of the steel scraps used in this example is as follows:

C — 0.20%
Si — 0.20%
Mn — 0.50%
P — 0.020%
Cr — 0.05%

When oxygen was blown into the furnace at a flow rate of 2.3 m³/t, 20 minutes after an electric current was supplied to the charge, the temperature of iron melt was found to be 1350° C, at the time of melting down, and the recarburizing reaction and the oxidizing reaction was carried out in parallel with each other, thus obtaining an iron melt having the following composition:

C — 2.80%
Si — 0.08%
Mn — 0.13%
P — 0.015%
Cr — 0.01%

After slags had been removed and the melt had been heated to a temperature of 1550° C, the recarburizing reaction further proceeded, thus obtaining an iron melt having the following composition:

C — 3.60%
Si — 0.10%
Mn — 0.15%
0.015%
Cr — 0.01%

Since silicon should be added to the above iron melt to be used as a primary melt for the spheroidal graphite cast iron having a ferrite matrix in as cast state, silicon was added thereto to thereby obtain a iron melt but adapted as a primary melt for the spheroidal graphite cast iron having a ferrite matrix in as cast state and having a composition as follows:

C — 3.60%
Si — 1.75%
Mn — 0.15%
P — 0.015%
Cr — 0.01%

Figure 8:
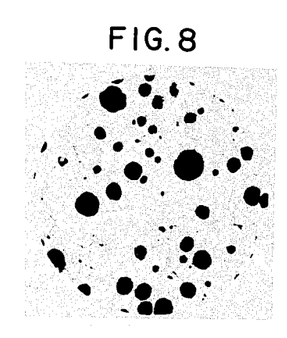

The following is the chemical composition of the spheroidal graphite cast iron having a ferrite marix in as cast state, which had been obtained by subjecting the above primary melt to the spheroidizing treatment and inoculating treatment. FIG. 8 shows the microscopic structures thereof.

C — 3.58%
Si — 2.62%
Mn — 0.15%
P — 0.015%
S — 0.006%
Cr — 0.01%
Mg — 0.050%

As can be seen from the aforesaid examples according to the present invention, an oxidizing reaction takes place in the course of melting or immediately after the melting of the iron scraps, i.e., in a relatively low temperature range, so that the loss of carbon, which is effectively element, may be minimized, while insuring a value of no less than 90% for a recarburizing yield, and yet the graphitizing preventive elements such as Mn, Cr and the like may be removed according to oxidation, thus achieving the objects of the present invention.

EXAMPLE 4

3.5% (525 kg) of powdered recarburizer was charged on the bottom of an arc furnace to be added to 15 tons of iron scraps charged, and then 50% (7.5 t) of sponge iron (4% in terms of unreduced iron) was charged on top of the charge thus prepared, after which steel scraps were charged thereon. The compositions of the steel scraps and sponge iron are as follows:

| Steel scraps | | Sponge Iron | |
|---|---|---|---|
| C | 0.20 % | Total Fe | 92.0 % |

| Steel scraps | | Sponge Iron | |
|---|---|---|---|
| Si | 0.20 % | Metallic Fe | 84.0 % |
| Mn | 0.50 % | C | 1.20 % |
| P | 0.020 % | Mn | 0.07 % |
| Cr | 0.050 % | P | 0.008 % |
| Cu | 0.10 % | Cu | 0.008 % |
| Sn | 0.006 % | | |

When electric current was supplied to the charge thus prepared, the temperature of an iron melt was found to be 1355° C at the time of melting down, and the recarburizing and oxidizing reactions were carried out in parallel with each other, thus obtaining an iron melt having the following composition:

C — 3.10%
Si — 0.06%
Mn — 0.11%
P — 0.012%
Cr — 0.010%
Cu — 0.042%
Sn — 0.004%

After the slag had been removed and the melt was heated to a temperature of 1550° C, the recarburizing reaction further proceeded, thus obtaining an iron melt having the following composition:

C — 3.57%
Si — 0.06%
Mn — 0.12%
P — 0.012%
Cr — 0.010%
Cu — 0.041%
Sn — 0.004%

Since silicon should be added to the above iron melt to be used as a primary melt for the spheroidal graphite cast iron having a ferrite matrix in as cast and silicon was added thereto to thereby obtain an iron melt adapted as a primary melt for the above cast iron and having the following composition:

C — 3.61%
Si — 1.60%
Mn — 0.12%
P — 0.012%
Cr — 0.010%
Cu — 0.042%
Sn — 0.004%

Figure 9:
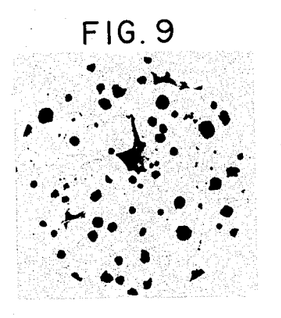

The following is the chemical composition of the spheroidal graphite cast iron having a ferrite matrix in as cast state, which had been obtained by subjecting the above primary melt to the spheroidizing treatment and inoculating treatment. FIG. 9 shows the microscopic structures thereof.

C — 3.60%
Si — 2.56%
Mn — 0.13%
P — 0.012%
Cr — 0.010%
Cu — 0.042%
Mg — 0.046%
S — 0.006%
Sn — 0.004%

The following example refers to the case where the amount of sponge iron was reduced, and the oxidizing reaction was supplemented by blowing oxygen into the furnace.

EXAMPLE 5

3.8% (570 kg) of powdered recarburizer was charged on the bottom of an arc furnace to be added to 15 tons of iron scraps, nd then 15% (2.25 t) of sponge iron was charged on top of the charge thus prepared, after which 12.75 t of steel scraps were charged thereon. The compositions of steel scraps and sponge iron as used in the present example are as follows:

| Steel Scraps | | Sponge Iron | |
|---|---|---|---|
| C  | 0.20 %  | Total Fe    | 92.0 %  |
| Si | 0.20 %  | Metallic Fe | 84.0 %  |
| Mn | 0.50 %  | C           | 1.20 %  |
| P  | 0.020 % | Mn          | 0.07 %  |
| Cr | 0.050 % | P           | 0.008 % |
| Cu | 0.15 %  | Cu          | 0.008 % |
| Sn | 0.006 % |             |         |

When oxygen was blown into the furnace at a flow rate of 2.5 m$^3$/t for 15 minutes, 25 minutes after the electric current was supplied to the charge, the temperature of an iron melt was found to be 1350° C at the time of melting down, and the recarburizing reaction and oxidizing reaction were carried out in parallel with each other, thus obtaining an iron melt having the following composition:

C — 3.12 %
Si — 0.06 %
Mn — 0.10 %
P — 0.015 %
Cr — 0.02 %
Cu — 0.070 %
Sn — 0.005 %

Since silicon should be added to the above iron melt to be used as a primary melt for the spheroidal graphite cast iron having a ferrite matrix in as cast state, the silicon was added thereto to thereby obtain an iron melt best adapted as a primary melt for the spheroidal graphite cast iron having a ferrite matrix in as cast state and having the following composition:

C — 3.65 %
Si — 1.80 %
Mn — 0.11 %
P — 0.015 %
Cr — 0.02 %
Cu — 0.070 %
Sn — 0.005 %

Figure 10:
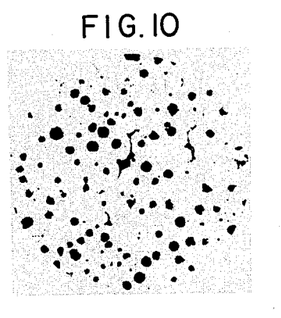

The following is the chemical composition of the spheroidal graphite cast iron having a ferrite matrix in as cast state, which had been obtained by subjecting the above primary iron melt to the spheroidizing treatment and inoculating treatment. FIG. 10 shows the microscopic structures thereof.

C — 3.60 %
Si — 2.60 %
Mn — 0.11 %
P — 0.015 %
S — 0.006 %
Cr — 0.02 %
Cu — 0.075 %
Mg — 0.050 %
Sn — 0.005 %

As can be seen from the aforesaid examples according to the present invention, an oxidizing reaction takes place in the course of melting or immediately after the melting of the iron scraps, i.e., in a relatively low temperature range, so that the loss of carbon, which is effective element, may be minimized, while insuring a value of no less than 90 % for a recarburizing yield, and yet the graphitizing preventive elements such as Mn, Cr and the like may be removed according to the oxidation, so that there may be obtained cast iron of the type described, which is less in contents of Cu, Sn.

EXAMPLE 6

3.8% (570 kg) of powdered recarburizer was charged on the bottom of an arc furnace to be added to 15 tons of iron scraps, and then 15,000 kg of steel scraps were charged on top of the charge thus prepared. The composition of steel scraps used in this example is as follows:

C — 0.20 %
Si — 0.20 %
Mn — 0.50 %
P — 0.02 %
Cr — 0.05 %

When 2.0% of iron ore having a grain size of 0.5 to 5 mm was blown for 16 minutes by being carried by oxygen gas having a flow rate of 1.8 m$^3$/t, 20 minutes after the electric current had been supplied to the charge thus prepared, then the temperature of the iron melt at the time of melting down was found to be 1360° C, and the recarburizing reaction and the oxidizing reaction were carried out in parallel with each other, thus obtaining an iron melt having the following composition:

C — 2.75 %
Si — 0.06 %
Mn — 0.09 %
P — 0.025 %
Cr — 0.01 %

After the slag had been removed and the melt was heated to a temperature of 1550° C, the recarburizing reaction further proceeded, thus obtaining an iron melt having the following composition:

C — 3.55 %
Si — 0.08 %
Mn — 0.09 %
P — 0.015 %
Cr — 0.01 %

Since silicon should be added to the above iron melt to be used as a primary melt for the spheroidal graphite cast iron having a ferrite matrix in as cast state, silicon was added thereto, and thus an iron melt having the following composition was obtained:

C — 3.60 %
Si — 1.80 %
Mn — 0.10 %
P — 0.016 %
Cr — 0.01 %

Figure 11:
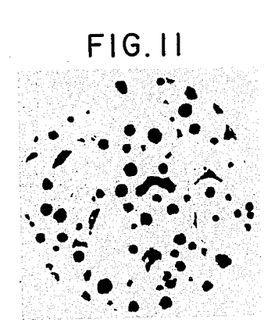

The following is the chemical composition of the spheroidal graphite cast iron having a ferrite matrix in as cast state, which had been obtained by subjecting the above primary melt to the spheroidizing treatment and inoculating treatment. FIG. 11 shows the microscopic structures thereof.

C — 3.48 %
Si — 2.60 %
Mn — 0.10 %
P — 0.016 %
S — 0.005 %
Cr — 0.01 %
Mg — 0.047 %

The following example refers to the case where the grain size of iron ore is considerably large.

EXAMPLE 7

3.8% (570 kg) of powdered recarburizer was charged on the bottom of an arc furnace to be added to 15 tons of iron scraps, and then 15,000 kg of steel scraps were charged on top of the charge thus prepared. The chemical composition of the steel scraps used in this example is as that given in Example 6.

When an iron ore having a grain size of 5 to 15 mm was blown for 15 minutes in the furnace by being carried by oxygen gas having a flow rate of 2.0 m$^3$/t, 25 minutes after an electric current had been supplied to the charge thus prepared, the temperature of an iron melt was found to be 1350° C at the time of melting down, and the recarburizing reaction and oxidizing reaction were carried out in parallel with each other, thus obtaining an iron melt having the following composition:

C — 2.82 %
Si — 0.04 %
Mn — 0.11 %
P — 0.017 %
Cr — 0.01 %

After slag had been removed and the melt was heated to a temperature of 1540° C, the recarburizing reaction further proceeded, thus obtaining an iron melt having the following composition:

C — 3.66 %
Si — 0.04 %
Mn — 0.12 %
P — 0.017 %
Cr — 0.01 %

Since silicon should be added to the above melt to be used as a primary melt for the spheroidal graphite cast iron having a ferrite matrix in as cast state, silicon was added thereto, and the iron melt having the following composition was obtained:

C — 3.65 %
Si — 1.90 %
Mn — 0.12 %
P — 0.017 %
Cr — 0.01 %

Figure 12:
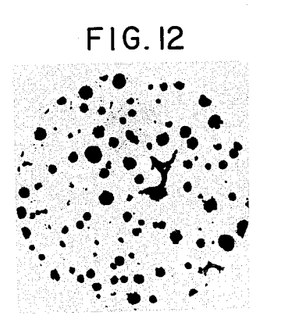

The following is the chemical composition of the spheroidal graphite cast iron having a ferrite matrix in as cast state, which had been obtained by subjecting the above primary melt to the spheroidizing treatment and inoculating treatment. FIG. 12 shows the microscopic structures thereof.

C — 3.51 %
Si — 2.56 %
Mn — 0.12 %
P — 0.017 %
S — 0.006 %
Cr — 0.01 %
Mg — 0.052 %

As can be seen from the aforesaid examples according to the present invention, the oxidizing reaction rapidly takes place in the course of melting or immediately after the melting of iron scraps, i.e., in a relatively low temperature range, so that the loss of carbon, which is effective element, may be minimized, while insuring a value of no less than 90 % for a recarburizing yield, and yet the graphitizing preventive elements such as Mn, Cr and the like may be removed according to oxidiation, thus achieving the objects of the present invention.

In general, it is desirable that the manganese content be no more than 0.25 %, for producing spheroidal graphite cast iron which dispenses with annealing, and has a ferrite matrix in as cast state. However, Mn content of steel scraps as a principal source of the iron for casting is as high as 0.4 to 0.7% and the contents of Cu and Sn are high in some cases. Accordingly, there has not been disclosed an attempt to provide an industrial process to obtain a primary melt for spheroidal graphite cast iron having a ferrite matrix in as cast state and a low Mn content, principally from commercially available steel scraps, so that a great amount of special type pig iron having a low Mn content should be charged.

In contrast thereto, according to the melting process of the invention, commercially available steel scraps and some amount of sponge iron or iron ore may be used as a starting material, without using costly and not readily available special pig iron, and the existing equipments may be used intact for obtaining a primary melt for spheroidal graphite cast iron having a ferrite matrix in as cast state and a low Mn content.

In addition, the recarburizing reaction is carried out simultaneously or in parallel with the oxidizing reaction due to the use of oxidative slag which has been produced by a strong oxidative slag-forming agent or oxygen which is being blown into the furnace; or the recarburizing reaction may be carried out in parallel with the oxidizing reaction due to the use of unreduced iron contained in the sponge iron and or oxygen which has been blown into the furnace, as required; or otherwise the recarburizing reaction may be carried out in parallel with the oxidizing reaction according to the blowing of iron ore, which is carried by oxygen; so that the oxidizing reaction may be accelerated.

Thus, the process according to the present invention may prevent an economical loss without an increase in the operation and man hours, as compared with the prior arc melting processes using special pig iron.

In addition, according to the melting process of the invention, there result less loss of C, Si which are effective elements, and an improved recarburizing yeield, so that there is not required a great amount of operation hours for recarburizing operation, presenting economical and industrial advantage, as compared with the prior art melting processes, in which the recarburizing reaction is carried out separately of the oxidizing reaction, i.e., in which removal of Mn is carried out after the recarburizing operation, or recarburizing operation is carried out after the removal of Mn. Thus, the melting process according to the present invention presents considerable advantages in industries.

What is claimed is:

1. A cast iron melting process for producing a primary melt for spheroidal graphite cast iron in an arc furnace having a bottom portion for containing iron melt therein and an electric arc-producing means, comprising the steps of: charging granular recarburizer for providing carbon to the iron melt into the bottom portion of the arc furnace to form a layer of recarburizer thereon; and charging irons scraps and a material adapted to form an oxidative slag onto the layer of recarburizer; and actuating the arc-producing means to supply heat to the furnace and to form an iron melt above said layer of recarburizer with a layer of oxidative slag thereon, whereby a recarburizing reaction of said recarburizer with the iron melt is carried out simultaneously with an oxidizing reaction of said iron melt with said oxidative slag at a low temperature range in the course of melting of said iron scraps and the heating of the iron melt.

2. A cast iron melting process according to claim 1 wherein said material adapted to form an oxidative slag is an oxidative slag forming agent; and said arc-producing means is actuated by supplying an electric current thereto.

3. A cast iron melting process for producing a primary melt for spheroidal graphite cast iron in an arc furnace having a bottom portion for containing iron melt therein and an electric arc-producing means, comprising the steps of: charging granular recarburizer for providing carbon to the iron melt into the bottom portion of the arc furnace to provide a layer of recarburizer therein; charging iron scraps onto the top of said layer of recarburizer; supplying an electric current to said arc-producing means to supply heat to the furnace and to form an iron melt above said layer of recarburizer; and blowing oxygen gas after the commencement of melting of said iron scraps to form said iron melt; whereby a recarburizing reaction of said recarburizer with the iron melt is carried out simultaneously with an oxidizing reaction of said iron melt with said oxidizing gas at a low temperature range in the course of melting of said iron scraps and the heating of said iron melt.

4. A cast iron melting process for producing a primary melt for spheroidal graphite case iron in an arc furnace having a bottom portion for containing iron melt therein and an electrical arc-producing means, comprising the steps of: charging granular recarburizer for providing carbon to the iron melt into the bottom portion of the arc furnace to provide a layer of recarburizer therein; charging iron scraps and sponge iron onto said layer of recarburizer; and supplying an electric current to said arc-producing means to supply heat to the furnace and to form an iron melt above said layer of recarburizer with a layer of oxidative slag thereon; whereby a recarburizing reaction of said recarburizer with said iron melt is carried out simultaneously with an oxidizing reaction of said iron melt with the oxidative slag formed from unreduced iron contained in said sponge iron in a low temperature range in the course of melting of said iron slag and the heating of said iron melt.

5. A cast iron melting process according to claim 4 wherein there is included an additional step of: blowing oxygen after said iron scraps and sponge iron have commenced melting whereby the oxidizing reaction of said iron melt with an oxidative slag formed from unreduced iron in said sponge iron is also effected by said oxygen.

6. A cast iron melting process for producing a primary melt for spheroidal graphite case iron in an arc furnace having a bottom portion for containing iron melt therein and an electrical arc-producing means comprising the steps of: charging granular recarburizer for providing carbon to said iron melt into the bottom portion of the arc furnace to provide a layer of recarburizer therein; charging iron scraps onto the layer of recarburizer within said furnace and supplying an electric current to said arc-producing means to supply heat to the furnace and to form an iron melt above said layer of recarburizer; and blowing iron ore which is carried by oxygen into said arc furnace onto said iron scraps, after said iron scraps have commenced to melt; whereby an recarburizing reaction of said recarburizer with said iron melt is carried out simultaneously with an oxidizing reaction of said iron melt with said iron ore and oxygen in a lower temperature range in the course of the melting of said scraps and the heating of said iron melt.

7. A cast iron melting process as defined in claims 1, wherein the recarburizer of a grain size of no more than 10 mm is used.

8. A cast iron melting process as defined in claims 1, wherein the recarburizer of a grain size of no more than 6 mm is used.

9. A cast iron melting process as defined in claims 1, wherein the recarburizer of a grain size of no more than 2.5 mm is used.

10. A cast iron melting process as defined in claim 4, wherein the sponge iron is mixed and charged so as to provide an unreduced-iron equivalent amount of 2 to 10% by weight.

11. A cast iron melting process as defined in claim 5, wherein the sponge iron is mixed and charged so as to provide an unreduced-iron equivalent amount of 2 to 10% by weight.

12. A cast iron melting process as defined in claim 6, wherein iron ore of a grain size of 0.5 to 15 mm is blown into said furnace, with oxygen gas used as carrier gas.

13. A cast iron melting process as defined in claim 6, wherein iron ore of a grain size of 0.5 to 5 mm is blown into said furnace, with oxygen used as a carrier gas.

14. A cast iron melting process as defined in claim 2, wherein the recarburizer of a grain size of no more than 10 mm is used.

15. A cast iron melting process as defined in claim 3, wherein the recarburizer of a grain size of no more than 10 mm is used.

16. A cast iron melting process as defined in claim 4, wherein the recarburizer of a grain size of no more than 10 mm is used.

17. A cast iron melting process as defined in claim 5, wherein the recarburizer of a grain size of no more than 10 mm is used.

18. A cast iron melting process as defined in claim 6, wherein the recarburizer of a grain size of no more than 10 mm is used.

19. A cast iron melting process as defined in claim 2, wherein the recarburizer of a grain size of no more than 6 mm is used.

20. A cast ironing melting process as defined in claim 3, wherein the recarburizer of a grain size of no more than 6 mm is used.

21. A cast iron melting process as defined in claim 4, wherein the recarburizer of a grain size of no more than 6 mm is used.

22. A cast iron melting process as defined in claim 5, wherein the recarburizer of a grain size of no more than 6 mm is used.

23. A cast iron melting process as defined in claim 6, wherein the recarburizer of grain size of no more than 6 mm is used.

24. A cast iron melting process as defined in claim 2, wherein the recarburizer of a grain size of no more than 2.5 mm is used.

25. A cast iron melting process as defined in claim 3, wherein the recarburizer of a grain size of no more than 2.5 mm is used.

26. A cast iron melting process as defined in claim 4, wherein the recarburizer of a grain size of no more than 2.5 mm is used.

27. A cast iron melting process as defined in claim 5, wherein the recarburizer of a grain size of no more than 2.5 mm is used.

28. A cast iron melting process as defined in claim 6, wherein the recarburizer of a grain size of no more than 2.5 mm is used.

29. A cast iron melting process as defined in claim 1, wherein said lower temperature range is below 1440° C.

30. A cast iron melting process as defined in claim 1, wherein said granular recarburizer has a particle size that is selected so that the iron melt will not make ingress into voids among the layer of granular recarburizer and an interface is formed between the iron melt and the layer of recarburizer.

31. A cast iron melting process as defined in claim 1, wherein the layer of recarburizer is arranged in the bottom portion of the arc furnace so that the layer has a top surface that is substantially flat in horizontal direction and the material adapted to form an oxidative slag is scattered thereon followed by superposition of the iron scraps thereon, said material adapted to form an oxidative slag having a melting point lower than the iron scraps, whereby the iron scraps are initially melted to form droplets that flow through the material adapted to form an oxidative slag to melt the material and to remove elements in the iron melt having a strong oxygen affinity and the oxidation products that are formed fused together to form a layer of oxidative slag above said iron melt.

32. A cast iron melting process as defined by claim 1, wherein said iron scraps consist essentially of steel scraps having a manganese content in the range of 0.4 to 0.7%, said oxidizing reaction taking place along an interface formed between the oxidative slag and said iron melt sufficiently to reduce the content of manganese in the iron melt to that at which allows the primary melt obtained thereby to be suitable as a spheroidal graphite cast iron having a ferrite matrix in the cast state.

33. A cast iron melting process for producing a primary melt for spheroidal graphite cast iron in an arc furnace having a bottom portion for containing iron melt therein and an electrical arc-producing means, which comprises charging granular recarburizer for providing carbon to iron melt within the furnace into the bottom portion of the arc furnace to provide a layer of recarburizer therein, charging iron scraps onto the layer of recarburizer, actuating the arc-producing means to supply heat to the furnace to form an iron melt above said layer of recarburizer, and providing an oxidizing medium above the iron melt whereby a recarburizing reaction of said recarburizer with the iron melt is carried out simultaneously with an oxidizing reaction of said iron melt with said oxidizing medium at a temperature range below 1440° C.

34. A cast iron melting process as defined in claim 33, wherein said oxidizing medium is provided by an oxidative slag forming agent which is introduced into the furnace on top of said layer of recarburizer.

35. A cast iron melting process as defined in claim 33, wherein said oxidizing medium is provided by blowing oxygen into said furnace.

36. A cast iron melting process as defined in claim 33, wherein the oxidizing medium is applied to said furance by blowing iron or with oxygen carrier into said furnace.

37. A cast iron melting process as defined in claim 32, wherein said recarburizer is powdered pitch coke.

* * * * *

UNITED STATES PATENT OFFICE
CERTIFICATE OF CORRECTION

Patent No. 4,021,232          Dated May 3, 1977

Inventor(s) Michio MAKINO et al.

It is certified that error appears in the above-identified patent and that said Letters Patent are hereby corrected as shown below:

Item (30) should read:

FOREIGN APPLICATION PRIORITY DATA

Aug. 9, 1974    Japan   ................... 49-90797

Apr. 30, 1975    Japan   ................... 50-51396

Apr. 30, 1975    Japan   ................... 49-51397

Signed and Sealed this twenty-sixth Day of July 1977

[SEAL]

*Attest:*

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 4,021,232      Dated May 3, 1977

Inventor(s) Michio MAKINO, et al.

It is certified that error appears in the above-identified patent and that said Letters Patent are hereby corrected as shown below:

Item (30) should read:

FOREIGN APPLICATION PRIORITY DATA

| Aug. 9, 1974 | Japan | 49-90797 |
| Apr. 30, 1975 | Japan | 50-51396 |
| Apr. 30, 1975 | Japan | 50-51397 |

This certificate supersedes certificate issued July 26, 1977

Signed and Sealed this

Eighth Day of August 1978

[SEAL]

Attest:

RUTH C. MASON  
*Attesting Officer*

DONALD W. BANNER  
*Commissioner of Patents and Trademarks*